(12) United States Patent
Okumura et al.

(10) Patent No.: US 8,884,908 B2
(45) Date of Patent: Nov. 11, 2014

(54) ELECTRONIC APPARATUS

(71) Applicant: Panasonic Corporation, Osaka (JP)

(72) Inventors: Ryo Okumura, Osaka (JP); Yusuke Adachi, Osaka (JP); Masahiro Inata, Hyogo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/054,304

(22) Filed: Oct. 15, 2013

(65) Prior Publication Data

US 2014/0043272 A1    Feb. 13, 2014

Related U.S. Application Data

(63) Continuation of application No. PCT/JP2013/001725, filed on Mar. 14, 2013.

(30) Foreign Application Priority Data

May 9, 2012    (JP) ................................. 2012-107252

(51) Int. Cl.
*G06F 3/01*    (2006.01)
*G06F 3/041*    (2006.01)
*G06F 3/0354*    (2013.01)

(52) U.S. Cl.
CPC ............... *G06F 3/016* (2013.01); *G06F 3/041* (2013.01); *G06F 3/0354* (2013.01)
USPC .......................................................... 345/173

(58) Field of Classification Search
CPC ................................. G06F 3/016; G06F 3/041
USPC .......................................................... 345/173
See application file for complete search history.

(56) References Cited

U.S. PATENT DOCUMENTS

| | | | |
|---|---|---|---|
| 2001/0035854 A1 | 11/2001 | Rosenberg et al. | |
| 2004/0047120 A1 | 3/2004 | Saiki et al. | |
| 2004/0135767 A1* | 7/2004 | Park | 345/156 |
| 2006/0097996 A1 | 5/2006 | Tabata | |
| 2006/0109256 A1* | 5/2006 | Grant et al. | 345/173 |

(Continued)

FOREIGN PATENT DOCUMENTS

| | | |
|---|---|---|
| CN | 102033645 A | 4/2011 |
| JP | 3085481 U | 2/2002 |

(Continued)

OTHER PUBLICATIONS

International Search Report for corresponding International Application No. PCT/JP2013/001725, mailed Jun. 4, 2013.

(Continued)

*Primary Examiner* — Ariel Balaoing
(74) *Attorney, Agent, or Firm* — Renner, Otto, Boisselle & Sklar, LLP

(57) ABSTRACT

An electronic apparatus 10 includes a touch pad 11 for accepting a touch operation of a user, a support section 12 for supporting the touch pad 11, and a vibrating section 13 attached to the touch pad 11 for flexurally deforming the touch pad 11. As flexural vibration of the touch pad 11 is transmitted to the support section 12, the support section 12 deforms to vibrate in displacement vibration. An amplitude of the displacement vibration of the support section 12 is greater than an amplitude of the flexural vibration of the touch pad 11.

19 Claims, 13 Drawing Sheets

(56) References Cited

U.S. PATENT DOCUMENTS

| | | | |
|---|---|---|---|
| 2006/0181522 A1* | 8/2006 | Nishimura et al. | 345/177 |
| 2006/0192657 A1* | 8/2006 | Nishimura et al. | 340/407.2 |
| 2006/0256079 A1* | 11/2006 | Wu | 345/156 |
| 2008/0136788 A1 | 6/2008 | Nishikawa et al. | |
| 2011/0074706 A1 | 3/2011 | Son et al. | |
| 2011/0102341 A1 | 5/2011 | Imai et al. | |
| 2011/0141052 A1 | 6/2011 | Bernstein et al. | |
| 2011/0304569 A1 | 12/2011 | Kai et al. | |
| 2013/0241352 A1* | 9/2013 | Hayashi et al. | 310/323.01 |

FOREIGN PATENT DOCUMENTS

| | | |
|---|---|---|
| JP | 2004-110800 A | 4/2004 |
| JP | 2004-272651 A | 9/2004 |
| JP | 2005-258666 A | 9/2005 |
| JP | 2006-227712 A | 8/2006 |
| JP | 2007-082009 A | 3/2007 |
| JP | 2010-157037 A | 7/2010 |
| JP | 2010-244283 A | 10/2010 |
| JP | 2012-068823 A | 4/2012 |
| WO | WO 2010/106736 A1 | 9/2010 |
| WO | WO 2011/071837 A2 | 6/2011 |

OTHER PUBLICATIONS

Written opinion for corresponding International Application No. PCT/JP2013/001725, dated Jun. 4, 2013.

Chinese Search Report and English translation for corresponding Chinese Application No. 201380000961.6, dated Mar. 18, 2014.

Chinese Search Report for corresponding Chinese Application No. 201380000961.6 dated Aug. 5, 2014 and English translation thereof.

* cited by examiner

FIG.4
(a)
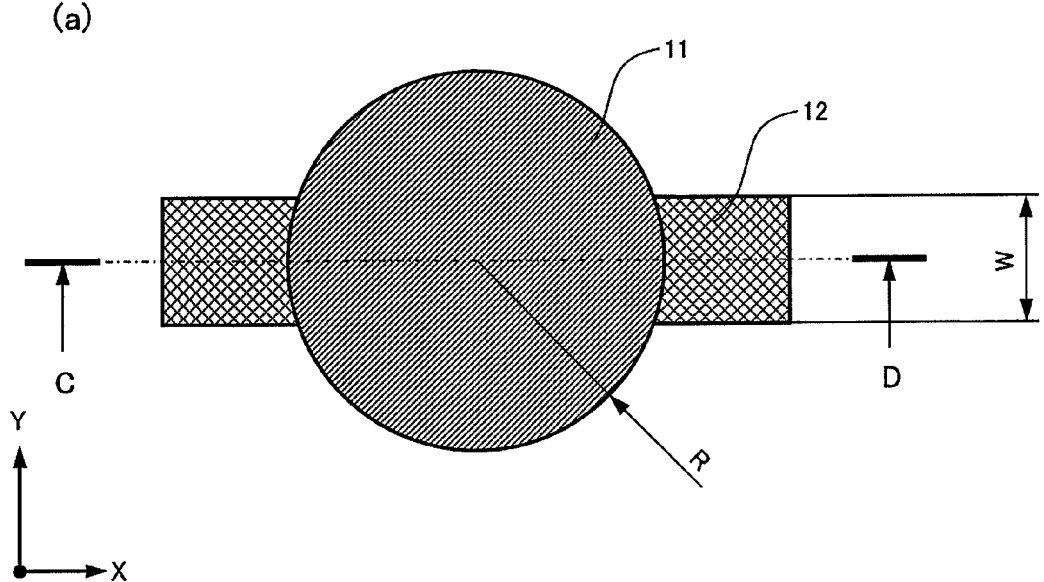
(b)
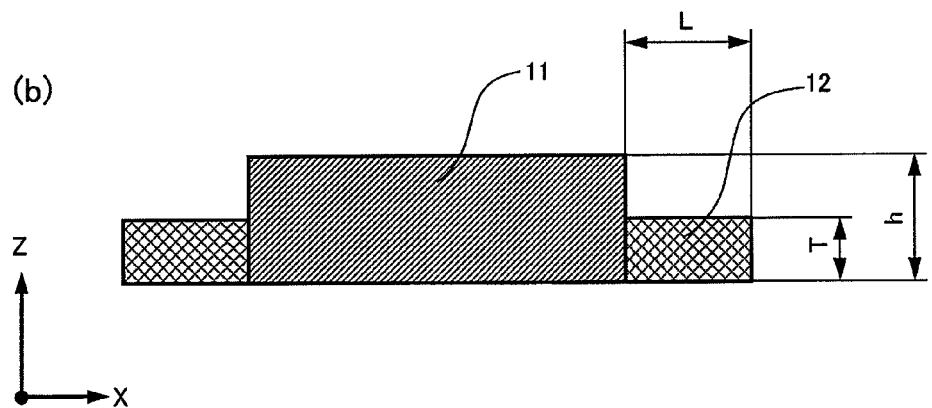

FIG.8
(a)
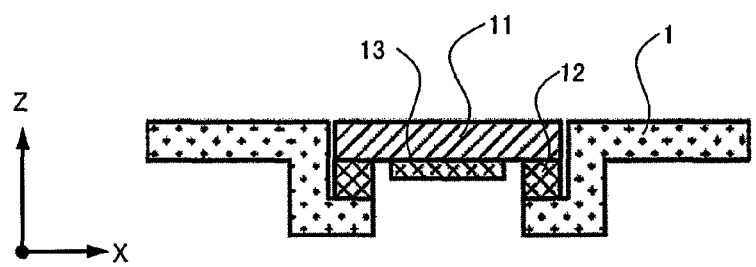
(b)
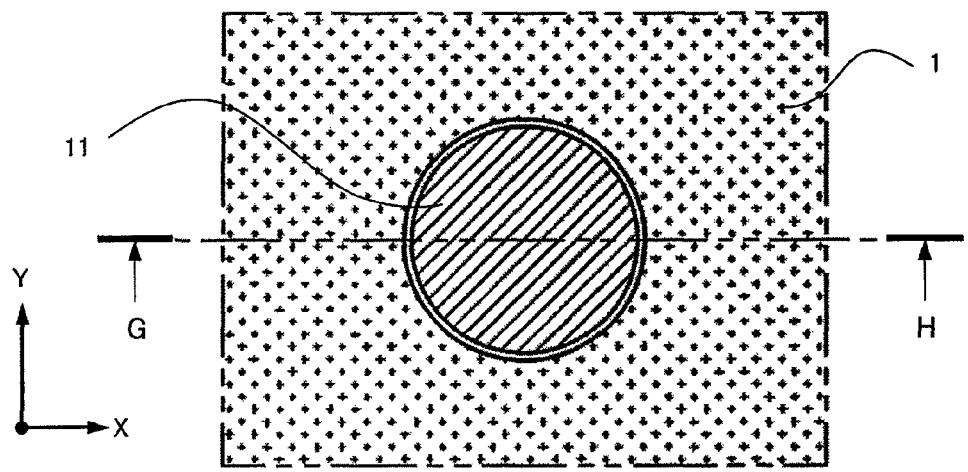
(c)
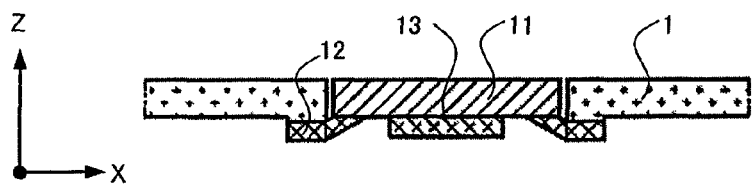

ELECTRONIC APPARATUS

This is a continuation of International Application No. PCT/JP2013/001725, with an international filing date of Mar. 14, 2013, which claims priority of Japanese Patent Application No. 2012-107252, filed on May 9, 2012, the contents of which are hereby incorporated by reference.

BACKGROUND

1. Technical Field

The present disclosure relates to a touch pad provided in a operation section, or the like, of various electronic apparatuses for use as an input device.

2. Description of the Related Art

Patent Document No. 1 (Japanese Laid-Open Patent Publication No. 2006-227712) discloses an electronic apparatus including a touch panel. The electronic apparatus includes fixation cushions arranged at four corners of a touch panel with a vibration element attached thereto. The fixation cushions are fixed to a fixation frame, supporting a touch panel on the fixation frame. Driving the vibration elements causes the touch panel to vibrate in flexural vibration, with the fixation cushion serving as the fulcrum thereof. The fixation cushion has flexibility that enables vibration and sufficient stiffness to serve as the fulcrum. Thus, it stably supports a flat-plate vibrator, such as a touch panel, while increasing the amount of vibration.

SUMMARY

The present disclosure provides an electronic apparatus capable of reducing the difference in tactile sensation depending on the touch position.

An apparatus according to one embodiment of the present disclosure includes: a touch pad 11 for accepting a touch operation of a user; a support section 12 for supporting the touch pad 11; and a vibrating section 13 attached to the touch pad 11 for flexurally deforming the touch pad 11. As the flexural vibration of the touch pad 11 is transmitted to the support section 12, the support section 12 deforms to vibrate in displacement vibration. The amplitude of the displacement vibration of the support section 12 is greater than the amplitude of the flexural vibration of the touch pad 11.

With the apparatus according to one embodiment of the present disclosure, it is possible to reduce the difference in tactile sensation depending on the touch position.

BRIEF DESCRIPTION OF DRAWINGS

FIG. 4(a) is a top view showing an example of the touch pad and the support section according to the embodiment, and FIG. 4(b) is a cross-sectional view showing an example of the touch pad and the support section according to the embodiment.

FIG. 8(a) to FIG. 8(c) are diagrams each showing an example of the support section according to the embodiment.

DETAILED DESCRIPTION

Figure 1:
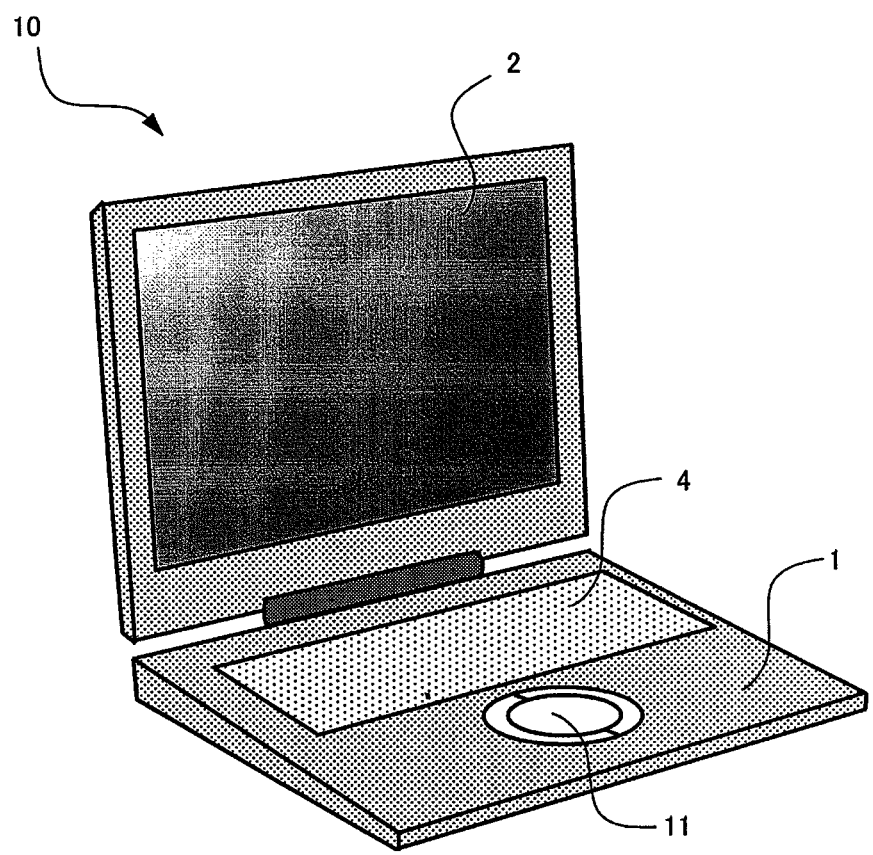
FIG. 1 is a perspective view showing the external appearance of an electronic apparatus according to an embodiment.

An embodiment will now be described in detail, referring to the drawings as necessary. Note however that unnecessarily detailed descriptions may be omitted. For example, detailed descriptions on what are well known in the art or redundant descriptions on substantially the same configurations may be omitted. This is to prevent the following description from becoming unnecessarily redundant, to make it easier for a, person of ordinary skill in the art to understand.

Note that the applicant provides the accompanying drawings and the following description in order for a person of ordinary skill in the art to sufficiently understand the present disclosure, and they are not intended to limit the subject matter set forth in the claims.

Embodiments

FIG. 1 is a perspective view showing the external appearance of an electronic apparatus 10 according to an embodiment. The electronic apparatus 10 is a notebook personal computer, for example. The electronic apparatus 10 includes a casing 1, a display 2, a touch pad 11, a keyboard 4, and a control circuit 16 (FIG. 2) for controlling vibrations. By performing a touch operation on the touch pad 11 of the electronic apparatus 10, a user can move a cursor displayed on the display 2 or execute an intended command. Moreover, the user can make a gesture input by performing a touch operation in a specific motion. For example, by performing a touch operation as if to draw a circle, a document displayed on the display 2 can be scrolled. By vibrating the touch operation surface of the control circuit 16 in response to a touch operation of the user, it is possible to give the user a tactile feedback. For example, by presenting a tactile sensation in accordance with the movement of the cursor, the user can tactilely feel the amount of movement of the cursor. By presenting a clicking feel when the user selects an icon, a button, a software keyboard, or the like, displayed on the display 2, the user can tactilely feel whether an intended command has been accepted. By presenting a tactile sensation upon a gesture input, it is possible to tactilely feel whether an intended gesture input has been accepted.

Figure 2:
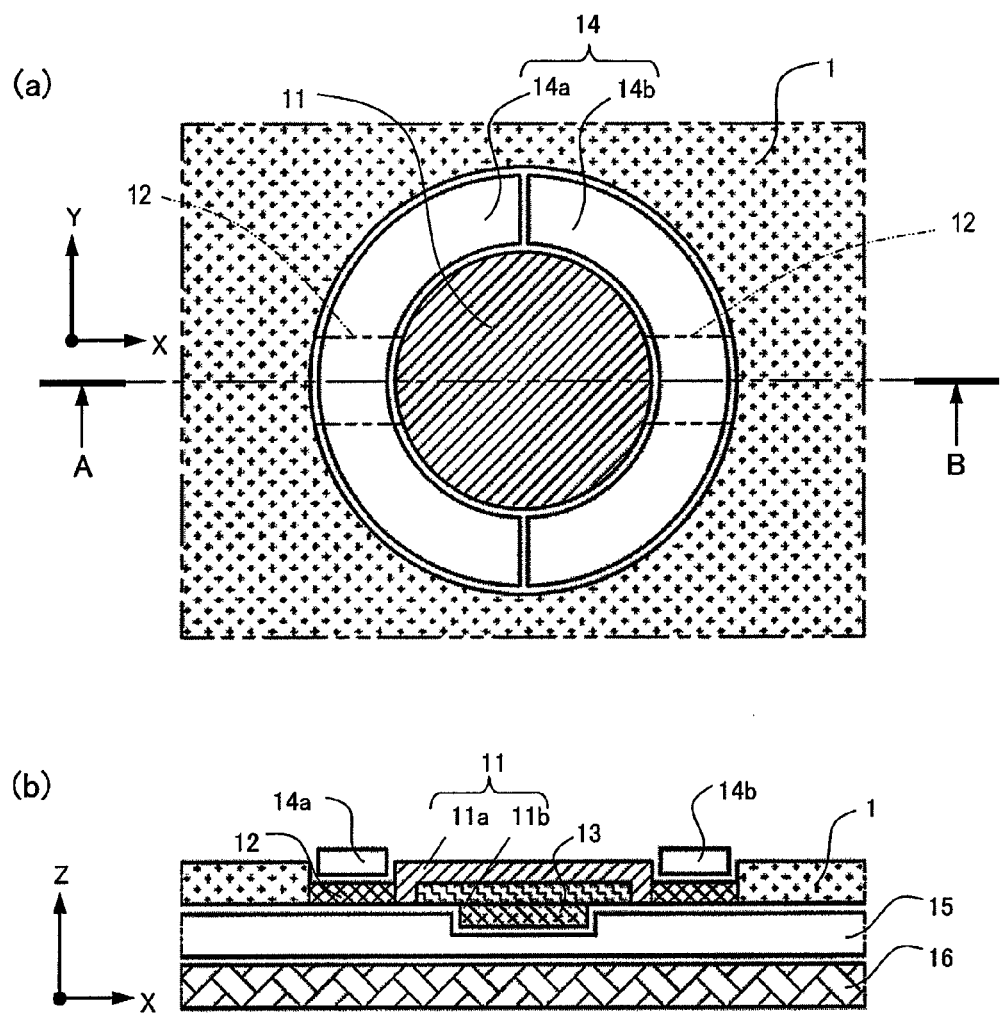
FIG. 2(a) and FIG. 2(b) are enlarged views each showing a portion of the electronic apparatus according to the embodiment.

FIG. 2 shows enlarged views each showing a portion of the electronic apparatus 10 according to the embodiment. FIG. 2(a) is a top view of the touch pad 11, and FIG. 2(b) is a cross-sectional view taken along A-B of FIG. 2(a). The X direction, the Y direction and the Z direction are now defined for the purpose of discussion. The left-right direction on the drawing sheet of FIG. 2(a) is defined as the X direction, and the up-down direction on the drawing sheet of FIG. 2(a) as the Y direction. The up-down direction on the drawing sheet of FIG. 2(b) is defined as the Z direction.

As shown in FIGS. 2(a) and 2(b), the touch pad 11 and the casing 1 are mechanically connected to each other by a support section 12. The touch pad 11 accepts touch operations of the user, and includes a touch operation section 11a to be touched by the user, and a touch sensor 11b for detecting touch operations of the user. A piezoelectric element 13 is attached on the opposite side of the touch operation surface of the touch pad 11 to be touched by the user. The touch pad 11 and the piezoelectric element 13 are connected to the control circuit 16. The control circuit 16 controls the vibration of the piezoelectric element 13. At least a portion of a decorative ring 14 is arranged between the casing 1 and the touch pad 11. A cushion sheet 15 is arranged between the touch pad 11 and the control circuit 16.

The touch operation section 11a is arranged at a position where it can be touched by the user, and is formed by a material having a certain level of rigidity, such as a resin, a glass, a metal, or a composite material thereof. The touch sensor 11b may be a known touch sensor, such as a pressure sensitive type, a capacitive type, an optical type, a surface acoustic wave type, or the like.

The support section 12 mechanically connects the casing 1 and the touch pad 11 to each other, and supports the touch pad 11 relative to the casing 1 in a non-cantilevered manner. For example, the touch pad 11 is supported by two or more support sections 12 at at least two locations, and the touch pad 11 is arranged between the two or more support sections. For example, the support sections 12 supports the touch pad 11 at opposite ends. The support sections 12 extend in a generally parallel direction to the touch operation section 11a of the touch pad 11, and are connected to the casing 1. The connecting portion between the casing 1 and the support section 12 is located on the outer side of the outer periphery of the touch pad 11. The support section 12 is formed by a material having a certain level of strength and elasticity, such as a resin, a metal, a rubber, a gel, or a composite material thereof. The casing 1 is formed by a metal, a resin, or a composite material thereof, and has sufficient rigidity to support the touch pad 11. The casing 1, the touch operation section 11a and the support section 12 may be molded as an integral unit.

The piezoelectric element 13 is an example of a vibrating section for flexurally deforming the touch pad 11 to thereby vibrate the touch pad 11. The piezoelectric element 13 is a thin electromechanical transducer element that expands/shrinks through the application of a voltage.

The decorative ring 14 is an example of a decorative part. The decorative ring 14 includes a left decorative ring 14a and a right decorative ring 14b. The decorative ring 14 is formed by a resin, a metal, a glass, or a composite material thereof. The decorative ring 14 improves the dust- and drip-proofness by preventing dust or drips from entering through the gap between the casing 1 and the touch pad 11. The decorative ring 14 also reduces the awkwardness on the external appearance by preventing the inside of the electronic apparatus 10 from being seen through the gap between the casing 1 and the touch pad 11. Moreover, the decorative ring 14 is protruding toward the surface side relative to the touch operation surface of the touch pad 11, and the height thereof in the Z direction is greater than that of the touch pad 11. Therefore, the user can tactilely feel the peripheral portion of the touch pad 11. The decorative ring 14 may function also as a mechanical switch, a touch sensor-type switch, or the like. For example, the left decorative ring 14a may be a left click switch, and the right decorative ring 14b a right click switch.

The cushion sheet 15 is a shock-absorbing material that collides with the control circuit 16 when the touch pad 11 vibrates, thereby preventing the generation of noise or damage. The cushion sheet 15 also prevents the touch sensor 11b and the piezoelectric element 13 from being short-circuited with the control circuit 16. The cushion sheet 15 also improves the dust- and drip-proofness by preventing dust or drips from entering the casing. Moreover, where the decorative ring 14 functions also as a mechanical switch, the cushion sheet 15 improves the tactile feel of the mechanical switch. The cushion sheet 15 is formed by a material having a certain level of elasticity and insulation, such as a rubber, a gel, a sponge, a resin, or a composite material thereof.

Figure 3:
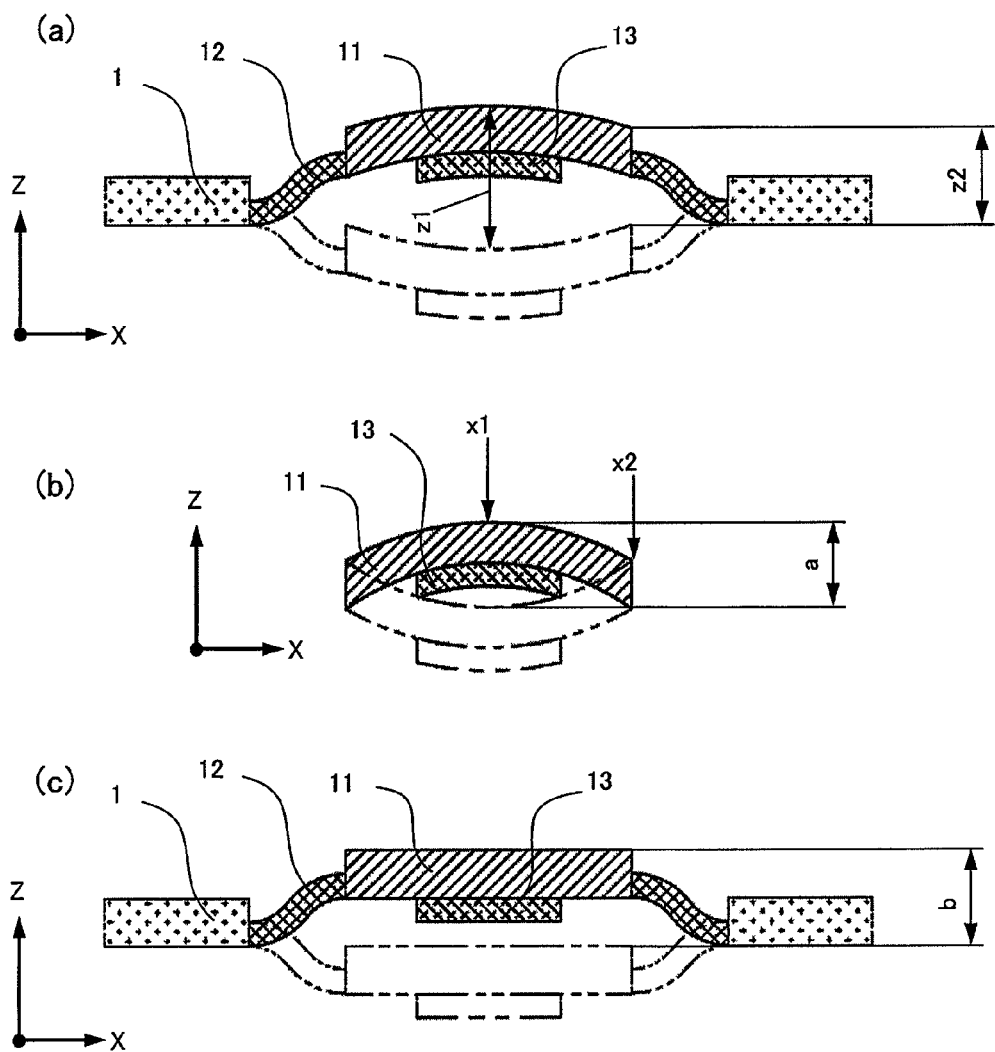
FIG. 3(a) is a diagram showing vibration according to the embodiment.
FIG. 3(b) is a diagram showing flexural vibration due to deformation of a touch pad according to the embodiment.
FIG. 3(c) is a diagram showing displacement vibration due to deformation of a support section according to the embodiment.

FIG. 3 shows vibration of the touch pad 11. Note that the magnitude of vibration may be exaggerated for ease of understanding of the figures. Members that are not directly related to vibration, such as the decorative ring 14, the cushion sheet 15 and the control circuit 16, may be omitted in the figures.

The vibration of the touch pad 11 of FIG. 3(a) can be classified into flexural vibration due to flexural deformation of the touch pad 11 as shown in FIG. 3(b), and displacement vibration due to deformation of the support section 12 as shown in FIG. 3(c). As the piezoelectric element 13 flexurally deforms the touch pad 11, the touch pad 11 generates flexural vibration, and the flexural vibration of the touch pad 11 is transmitted to the support section 12, thereby causing the support section 12 to deform and generate displacement vibration.

Herein, assume that a denotes the amplitude of the flexural vibration due to the flexural deformation of the touch pad 11, and b denotes the amplitude of the displacement vibration due to the deformation of the support section 12. The amplitude a of the flexural vibration is the amplitude observed when focusing only on the flexural deformation of the touch pad 11 without considering the displacement vibration. The amplitude b of the displacement vibration is the amplitude observed when focusing only on the deformation of the support section 12 without considering the flexural vibration. Moreover, x1 denotes the position of the antinode of the flexural vibration due to the flexural deformation of the touch pad 11, and x2 the position of the node thereof. Then, the vibration amplitude at the position x1 is z1 =a+b, and the vibration amplitude at the position x2 is z2 =b. Thus, the ratio between vibration amplitudes at the position x1 and the position x2 is z1/z2 =(a+b)/b=1+a/b. Therefore, the ratio between vibration amplitudes for different touch positions approaches 1 as the amplitude b of the displacement vibration is larger with respect to the amplitude a of the flexural vibration. Thus, by causing vibration so that the amplitude b of the displacement vibration of the support section 12 is greater than the amplitude a of the flexural vibration of the touch pad 11, it is possible to decrease the difference between the amplitude at the position of the antinode of the flexural vibration of the touch pad 11 and the amplitude at the position of the node of the flexural vibration of the touch pad 11, and to reduce the difference in tactile sensation between different touch positions on the touch operation surface.

In order to cause vibration so that the amplitude b of the displacement vibration is greater than the amplitude a of the flexural vibration, the spring constant k of the support section 12 is set so that the resonant frequency fk of the displacement vibration is lower than the resonant frequency fb of the flexural vibration. The control circuit 16 controls the piezoelectric element 13 so as to vibrate the touch pad 11 at a frequency fd near the resonant frequency fk of the displacement vibration. For example, the vibration frequency fd is set to a value of the resonant frequency fk±100 Hz. For example, the vibration frequency fd may be set to a value of the resonant frequency fk±30 Hz. Thus, the touch pad 11 is vibrated at a frequency fd that is closer to the resonant frequency fk of the displacement vibration than to the resonant frequency fb of the flexural vibration. Then, when the piezoelectric element 13 gives a vibration, resonance of the flexural vibration no longer occurs though resonance of the displacement vibration occurs. Thus, the amplitude b of the displacement vibration is greater than the amplitude a of the flexural vibration.

It is known that the frequency characteristics of human tactile sensation are such that the sensitivity is highest at 200 to 300 Hz and gradually decreases as the frequency increases. Therefore, in order to give the user a strong tactile sensation and reduce the difference in tactile sensation depending on the touch position, the vibration frequency fd is set to be less than 600 Hz, for example. In order to give the user an even stronger tactile sensation and reduce the difference in tactile sensation depending on the touch position, the vibration frequency fd is set to be 200 to 300 Hz, for example. Thus, while the vibration frequency fd is set to be 200 Hz or more and less than 600 Hz, for example, it may be less than 200 Hz. For example, it may also be 1 Hz.

In order to give the user an even stronger tactile sensation and reduce the difference in tactile sensation depending on the touch position, the spring constant k of the support section 12 is set so that the resonant frequency fk of the displacement vibration is less than 600 Hz, for example. In order to give the user an even stronger tactile sensation and reduce the difference in tactile sensation depending on the touch position, the resonant frequency fk of the displacement vibration is set to be 200 to 300 Hz. As described above, while the resonant frequency fk is set to be greater than or equal to 200 Hz and less than 600 Hz, for example, it may be less than 200 Hz.

In order to reduce the difference in tactile sensation depending on the touch position, the resonant frequency fb of the flexural vibration of the touch pad 11 is set to be greater than or equal to 600 Hz, for example. In order to further reduce the difference in tactile sensation depending on the touch position, the resonant frequency fb of the flexural vibration of the touch pad 11 may be set to be greater than or equal to 1 kHz, or may be 5 to 6 kHz, for example. Thus, the resonant frequency fb is set to be greater than or equal to 600 Hz, for example, with no particular upper limit, and it is for example set to be greater than or equal to 600 Hz and less than or equal to 6 kHz, for example. The resonant frequency fb is set to a frequency that is hardly felt or not felt by a human finger, for example.

Herein, assume that mt denotes the mass of the touch pad 11, and mp the mass of the piezoelectric element 13. Since the resonant frequency fk of the displacement vibration is a resonant frequency of a spring-mass system, where the support section 12 is the spring and the touch pad 11 and the piezoelectric element 13 are the mass, the following expression holds true.

$$fk = \frac{1}{2\pi}\sqrt{\frac{k}{mt+mp}} \qquad [\text{Exp. 1}]$$

Hence, 12.6 [kN/m]<k<28.4 [kN/m] holds true, where the mass of the touch pad 11 is mt=6 [g], the mass of the piezoelectric element 13 mp=2 [g], and 200 [Hz]<fk<300 [Hz]. Thus, in order to set the resonant frequency fk of the displacement vibration to be 200 to 300 Hz, the spring constant k of the support section 12 may be set to be 12.6 to 28.4 kN/m. In practice, however, since wiring, such as the flexible substrate connecting the touch sensor 11b and the piezoelectric element 13 to the control circuit 16, acts as a mechanical resistance, and it is necessary to take into consideration the mass of the support section 12 itself, the spring constant k is set in view of these.

FIG. 4(a) shows a top view of an example of the touch pad 11 and the support section 12, and FIG. 4(b) shows a cross-sectional view taken along C-D of FIG. 4(a). For example, there are six possible methods as follows for decreasing the spring constant k of the support section 12.

Figure 5A:
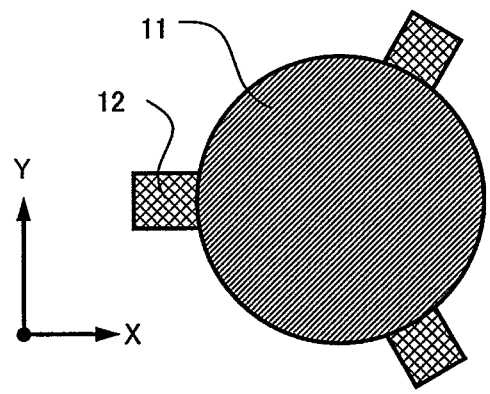
FIG. 5A is a diagram showing an example of the touch pad and the support section according to the embodiment.
Figure 5B:
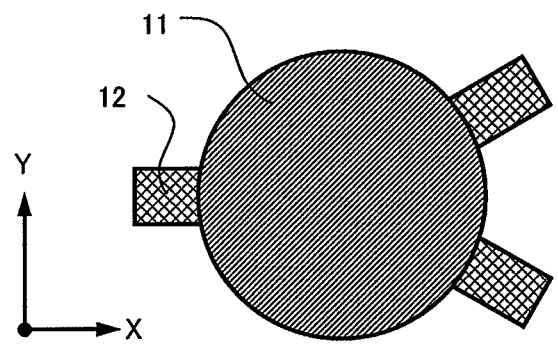
FIG. 5B is a diagram showing an example of the touch pad and the support section according to the embodiment.
Figure 5C:
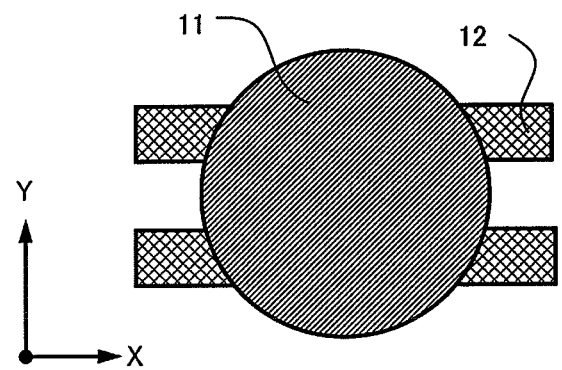
FIG. 5C is a diagram showing an example of the touch pad and the support section according to the embodiment.
Figure 5D:
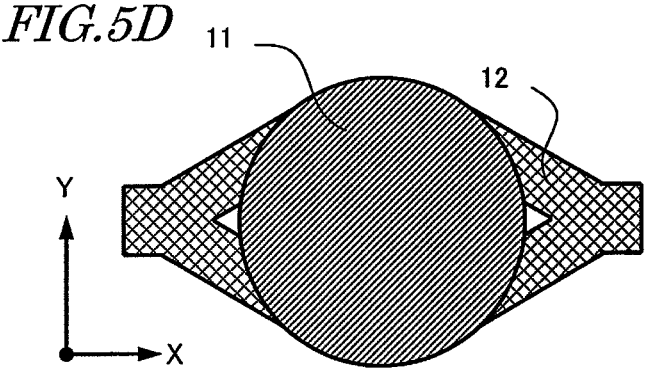
FIG. 5D is a diagram showing an example of the touch pad and the support section according to the embodiment.
Figure 5E:
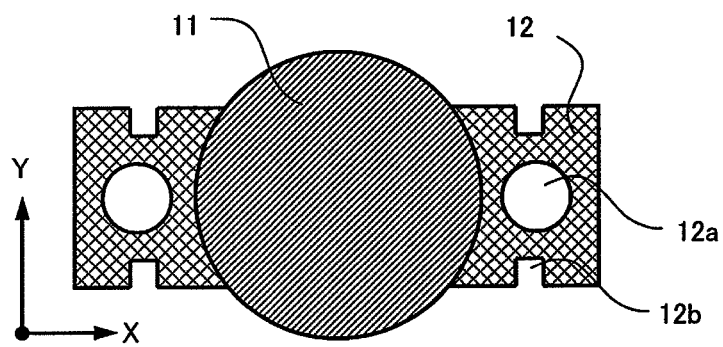
FIG. 5E is a diagram showing an example of the touch pad and the support section according to the embodiment.
Figure 5F:
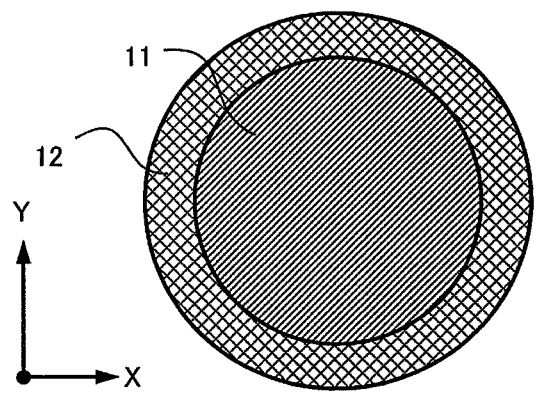
FIG. 5F is a diagram showing an example of the touch pad and the support section according to the embodiment.

(1) Decrease the width W of the support member 12.
(2) Decrease the thickness T of the support member 12.
(3) Increase the length L of the support member 12.
(4) Reduce the number of support members 12. (where it is ensured that the support will not be a cantilever support)
(5) Decrease the rigidity of the material of the support member 12.
(6) Change the shape of the support member 12. (e.g., to a bellows-like shape as shown in FIG. 5L to be discussed later)

Next, the resonant frequency fb of the flexural vibration due to the deformation of the touch pad 11 is calculated. For example, assume that the shape of the touch pad 11 is a disc shape with the radius R=20 mm and the thickness h=2 mm. Also assume that the material of the touch pad 11 is an ABS with the Young's modulus E=2.65 [GPa], the density ρ=1.05 and the Poisson's ratio ν=0.33. Herein, assuming that the fixation condition of the touch pad 11 is free support, the resonant frequency fb of the flexural vibration is given by the following expression.

$$fb = \frac{\lambda^2}{2\pi R^2}\sqrt{\frac{D}{\rho}} \qquad [\text{Exp. 2}]$$

$$\text{Flexural rigidity } D = \frac{Eh^3}{12(1-\nu^2)}$$

Typically, the touch pad 11 has a plurality of flexural vibration resonant frequencies. Since $\lambda^2=5.25$ for the $0^{th}$-mode resonance where the resonant frequency is lowest, the resonant frequency is fb=12.8 [kHz].

An actual touch pad is often a composite material of a glass epoxy substrate having a Young's modulus of 20 to 30 GPa and a resin. An actual touch pad is not on free support, but is supported in one way or another. Therefore, it is believed that the resonant frequency fb of the flexural vibration is higher than the value calculated herein. Thus, it is believed that the resonance of flexural vibration will not occur if the vibration frequency fd is set to be 200 to 300 Hz.

For example, there are six possible methods as follows for increasing the resonant frequency fb of the flexural vibration of the touch pad 11.

(1) Decrease the radius R of the touch pad 11.
(2) Increase the thickness h of the touch pad 11.
(3) Increase the rigidity of the material of the touch pad 11.
(4) Decrease the density of the material of the touch pad 11.
(5) Increase the Poisson's ratio of the material of the touch pad 11.
(6) Change the shape of the touch pad 11. (e.g., by providing a rib 17 as shown in FIG. 5M to be discussed later)

Note that by setting the components so that the amplitude of the touch pad 11 is about 5 to 50 μm, it is possible to present a tactile sensation (vibration) that feels comfortable on a human finger.

In the present embodiment, the electronic apparatus 10 at least includes: the casing 1; the touch pad 11 for accepting a touch operation of the user; the support section 12 for connecting the casing 1 and the touch pad 11 to each other; the piezoelectric element 13 attached to the touch pad 11 for flexurally deforming the touch pad 11; and the control circuit 16 for controlling the vibration of the piezoelectric element 13. The amplitude of the vibration due to the deformation of the support section 12 is greater than the amplitude of the vibration due to the deformation of the touch pad 11. This reduces the difference in vibration amplitude depending on the touch position of the user. Therefore, it is possible to reduce the difference in tactile sensation depending on the touch position.

In the present embodiment, the touch pad 11 has the resonant frequency fk of the displacement vibration due to the deformation of the support section 12, and the resonant frequency fb of the flexural vibration due to the deformation of the touch pad 11. The control circuit 16 performs a control so that the piezoelectric element 13 vibrates the touch pad 11 at a vibration frequency fd near the resonant frequency fk. The resonant frequency fb is higher than the resonant frequency fk. Thus, it is possible with a simple configuration to reduce the difference in tactile sensation depending on the touch position, and to obtain a large vibration amplitude by generating resonance of displacement vibration.

In the present embodiment, the casing 1, the touch operation section 11a and the support section 12 may be molded as an integral unit. Then, it is possible to obtain desired effects with a smaller number of parts. This also reduces the number of assembly steps, and contributes to a reduction of cost of an electronic apparatus.

In the present embodiment, the piezoelectric element 13 may be attached directly to the opposite side of the touch operation surface of the touch pad 11 to be touched by the user. This reduces the vibration propagating to the casing 1. Thus, it is possible to efficiently vibrate the touch pad 11.

In the present embodiment, the support section 12 may extend in a generally parallel direction to the touch operation surface. Then, it is possible to reduce the difference in tactile sensation depending on the touch position without increasing the size of the touch pad 11 in the thickness direction.

In the present embodiment, the decorative ring 14 is arranged in the gap between the touch pad 11 and the casing 1. Then, it is possible to effectively utilize the dead space between the touch pad 11 and the casing 1. The decorative ring 14 prevents the inside of the casing from being seen through the gap between the touch pad 11 and the casing 1, thereby increasing the dust-proof effect while reducing the awkwardness on the external appearance.

In the present embodiment, the decorative ring 14 is protruding toward the surface side relative to the touch operation surface. Then, the user can tactilely feel the peripheral portion of the touch pad 11.

Other Embodiments

FIGS. 5A to 5M show examples of the touch pad 11 and the support section 12 according to other embodiments. While there are two support sections 12 in the embodiment described above, the present disclosure is not limited thereto. The number of support sections 12 may be three as shown in FIG. 5A, or more than three. While the support sections 12 are arranged generally uniformly along the perimeter of the touch pad 11 in the embodiment described above, the present disclosure is not limited thereto. For example, as shown in FIG. 5B, the support sections 12 may not be arranged uniformly along the perimeter of the touch pad 11. While the support sections 12 extend radially from the center of the touch pad 11 in the embodiment described above, the present disclosure is not limited thereto. As shown in FIG. 5C, the support sections 12 may not extend radially from the center of the touch pad 11. While one support section 12 includes one connecting portion with the touch pad 11 in the embodiment described above, the present disclosure is not limited thereto. As shown in FIG. 5D, one support section 12 may include a plurality of connecting portions with the touch pad 11. As shown in FIG. 5E, the support section 12 may include a through hole 12a or a notch 12b formed therein. With such a configuration, the spring constant k of the support section 12 can be decreased. While there are a plurality of support sections 12 in the embodiment described above, the present disclosure is not limited thereto. For example, as shown in FIG. 5F, the support section 12 may have such a shape as to surround the entire perimeter of the touch pad 11.

Figure 5G:
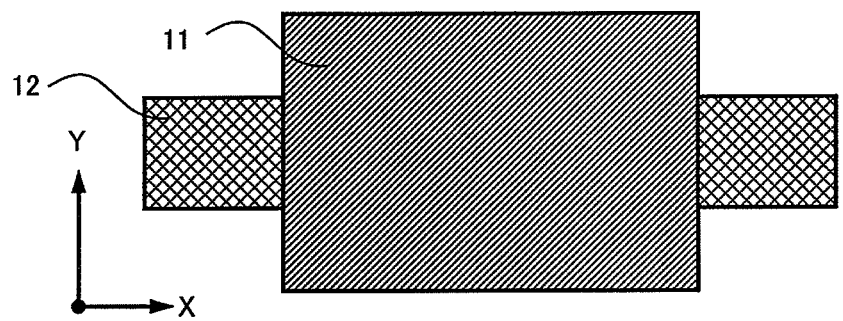
FIG. 5G is a diagram showing an example of the touch pad and the support section according to the embodiment.
Figure 5H:
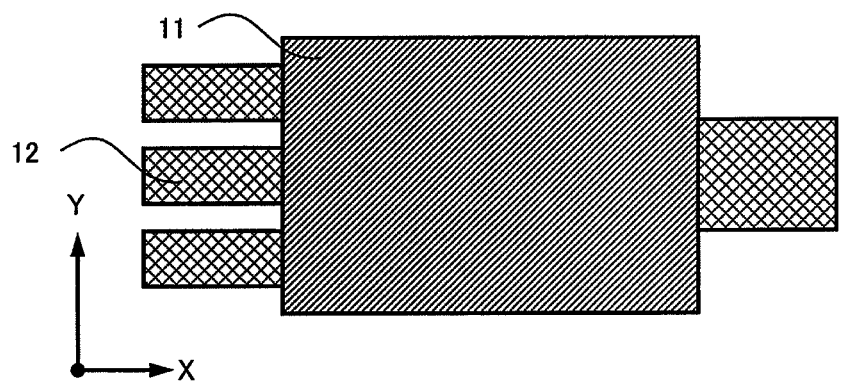
FIG. 5H is a diagram showing an example of the touch pad and the support section according to the embodiment.
Figure 5I:
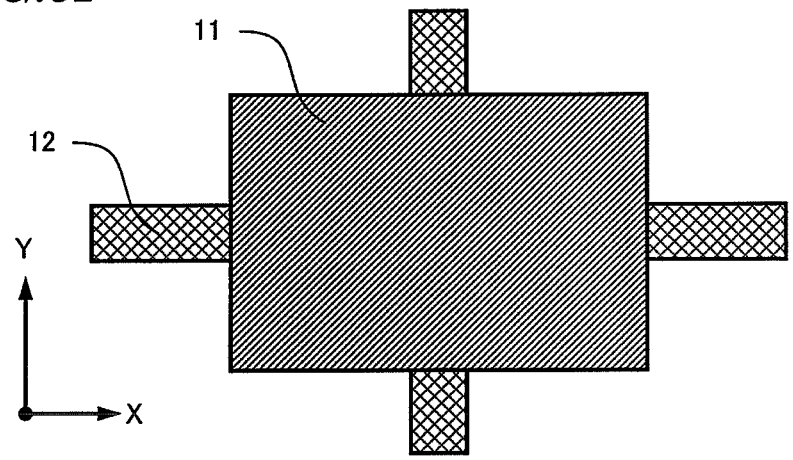
FIG. 5I is a diagram showing an example of the touch pad and the support section according to the embodiment.
Figure 5J:
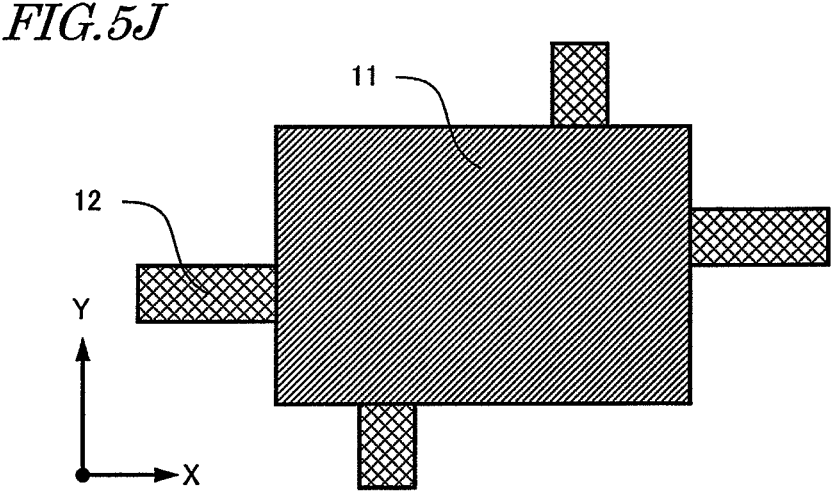
FIG. 5J is a diagram showing an example of the touch pad and the support section according to the embodiment.
Figure 5K:
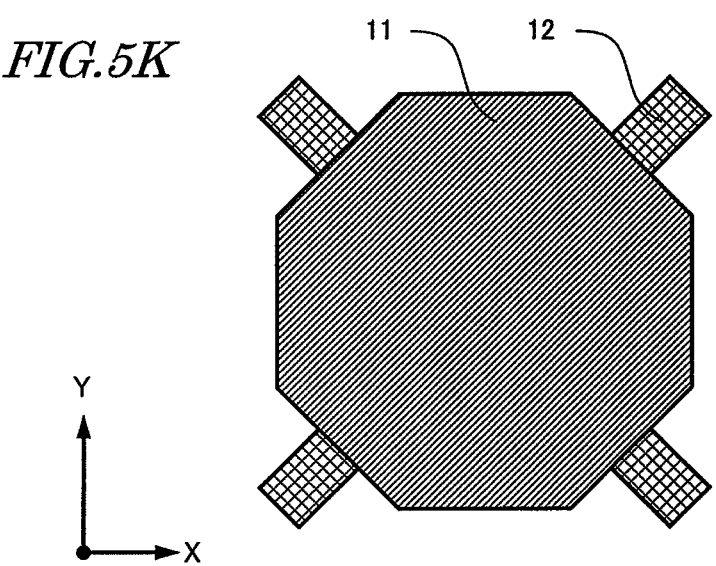
FIG. 5K is a diagram showing an example of the touch pad and the support section according to the embodiment.
Figure 5L:
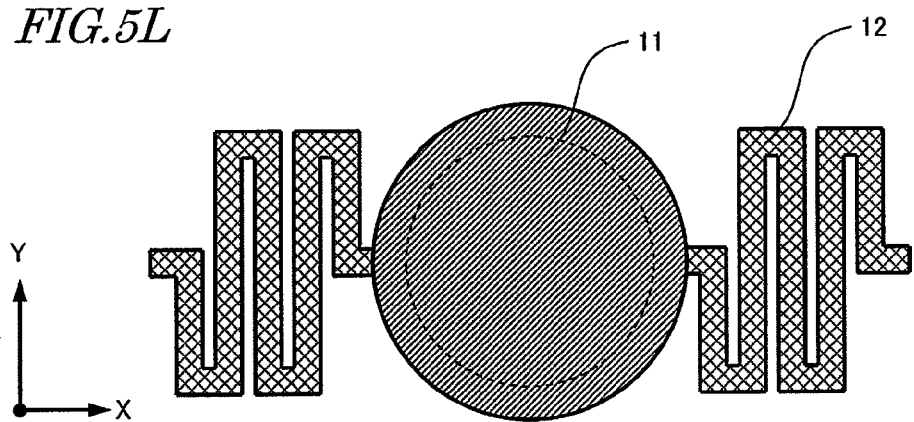
FIG. 5L is a diagram showing an example of the touch pad and the support section according to the embodiment.
Figure 5M:
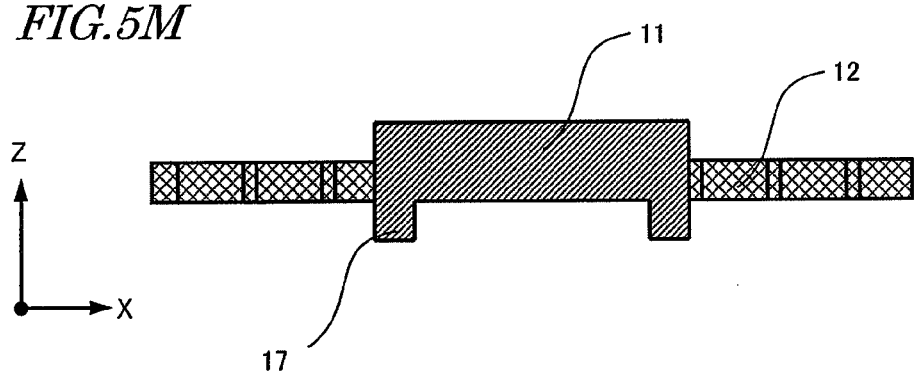
FIG. 5M is a diagram showing an example of the touch pad and the support section according to the embodiment.

For example, as shown in FIG. 5G, the shape of the touch pad 11 may be rectangular. While the shape and the number of support sections 12 connected to each of the opposing sides of the touch pad 11 are equal to each other in FIG. 5G, the present disclosure is not limited thereto. As shown in FIG. 5H, the shape and the number of support sections 12 connected to the opposing sides may different from each other. While the support sections 12 are connected to the short sides of the touch pad 11 in FIGS. 5G and 5H, the present disclosure is not limited thereto. The support sections 12 may be connected to the long sides of the touch pad 11, or may be connected to both the short sides and the long sides of the touch pad 11 as shown in FIG. 5I. While the support sections 12 are each arranged near the midpoint of a side of the touch pad 11 in FIGS. 5G to 5I, the present disclosure is not limited thereto. As shown in FIG. 5J, the support sections 12 do not have to be arranged near the midpoint of each side of the touch pad 11. The shape of the touch pad 11 is not limited to circular or rectangular. For example, it may be polygonal as shown in FIG. 5K. The shape of the touch pad 11 may be any shape as long as it is capable of detecting touch operations of the user.

The shape of the support section 12 may be bellows-like as shown in FIG. 5L. Then, the spring constant k of the support section 12 can be decreased. The touch pad 11 may be provided with a rib 17 as shown in FIG. 5M. Then, it is possible to increase the resonant frequency fb of the flexural vibration of the touch pad 11.

Figure 6:
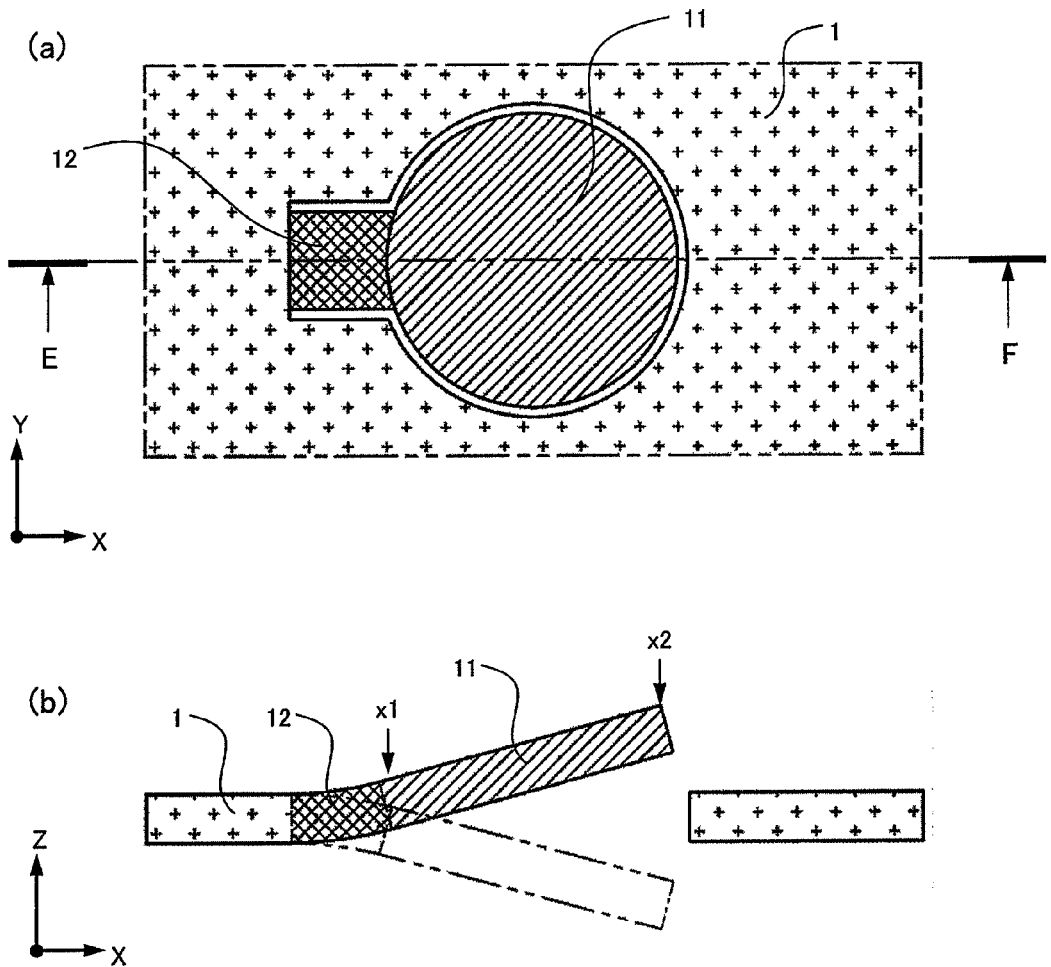
FIG. 6(a) is a top view showing a configuration where the support section is cantilevered.
FIG. 6(b) is a cross-sectional view showing a configuration where the support section is cantilevered.

FIG. 6(a) shows a top view of a configuration where the support section 12 is cantilevered, and FIG. 6(b) shows a cross-sectional view taken along E-F of FIG. 6(a). Where the manner of supporting the support section 12 is a cantilevered manner, the vibration amplitude at the position x1 and the vibration amplitude at the position x2 differ from each other as shown in FIG. 6(b). Thus, where the manner of supporting the support section 12 is a cantilevered manner, the tactile sensation differs depending on the touch position, resulting in the user feeling awkward. Therefore, the support section 12 preferably supports the touch pad 11 in a non-cantilevered manner. Supporting the touch pad 11 in a non-cantilevered manner reduces the difference in vibration amplitude depending on the touch position of the user. Therefore, it is possible to reduce the difference in tactile sensation depending on the touch position.

Embodiments have been described above as examples of the technique disclosed in the present application. However, the technique of the present disclosure is not limited thereto, but is also applicable to other embodiments in which changes, replacements, additions, omissions, etc., are made as necessary. Different ones of the components described in the embodiments above may be combined together to obtain a new embodiment.

While the touch operation section 11a and the touch sensor 11b are described as separate members in the present embodiment, the present disclosure is not limited thereto. For example, the touch sensor 11b may function also as the touch operation section 11a. The touch pad 11 may be opaque or transparent. A display panel may be arranged under the touch pad 11. The touch pad 11 may be of an on-cell type where it is bonded to the display panel, or of an in-cell type where the display panel itself detects touch operations. There is no limitation on the touch pad 11 as long as the touch pad 11 can be touched by the user and is capable of detecting touch operations of the user.

While the base section is the casing 1 in the present embodiment, the present disclosure is not limited thereto. For example, the base section may be the display panel arranged under the touch pad 11, or the substrate of the control circuit 16. There is no limitation on the base member as long as the base member is a member having a sufficient rigidity to support the touch pad 11. The casing 1 is not limited to the casing of the electronic apparatus 10, and where it is provided as a touch pad module, the casing 1 may be the casing of the module. The touch pad module, when mounted on or attached to the electronic apparatus 10, functions as an interface for accepting touch operations of the user.

While the piezoelectric element 13 is attached to the bottom surface side of the touch sensor 11b of the touch pad 11 in the present embodiment, the present disclosure is not limited thereto. For example, it may be arranged between the touch operation section 11a and the touch sensor 11b. There is no limitation on the piezoelectric element 13 as long as the piezoelectric element 13 can flexurally deform the touch pad 11 to thereby vibrate the touch pad 11.

A thin-film piezoelectric member may be formed on the touch operation section 11a or the touch sensor 11b by a method such as sputtering, and it may be used as the piezoelectric element 13.

While the piezoelectric element 13 is used as the vibrating section in the present embodiment, the present disclosure is not limited thereto. The vibrating section may be an artificial muscle, an electromagnetic actuator, or the like, for example.

Figure 7:
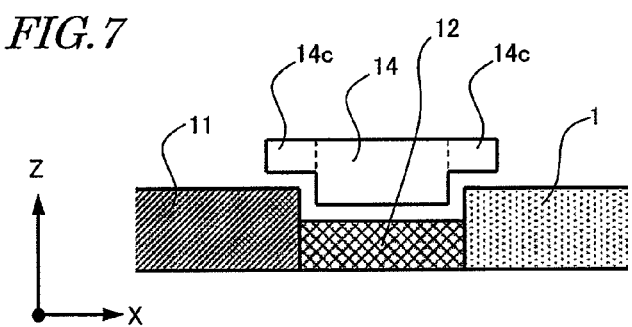
FIG. 7 is a diagram showing an example of a decorative ring according to the embodiment.

The decorative ring 14 of the present embodiment is an example, and the configuration, the shape and the material thereof are not limited thereto. For example, as shown in FIG. 7, the decorative ring 14 may include an overhang 14c over the touch pad 11 and the casing 1. Employing such a configuration further improves the dust- and drip-proofness. It also further reduces the awkwardness on the external appearance.

While the casing 1, the touch operation section 11a and the support section 12 are molded as an integral unit in the present embodiment, the present disclosure is not limited thereto. The casing 1, the touch operation section 11a and the support section 12 may be provided as separate units. The casing 1 and the support section 12 may be molded as an integral unit with the touch operation section 11a provided as a separate unit, or the touch operation section 11a and the support section 12 may be molded as an integral unit with the casing 1 provided as a separate unit.

While the support section 12 extends in a generally parallel direction along the surface direction of the touch operation surface of the touch pad 11 in the present embodiment, the present disclosure is not limited thereto. As shown in FIG. 8(a), the support section 12 may extend generally vertical to the touch operation surface of the touch pad 11. With such a configuration, it is possible to reduce the gap between the casing 1 and the touch pad 11 as shown in FIG. 8(b). Therefore, even without the decorative ring 14, it is possible to improve the dust- and drip-proofness and reduce the awkwardness on the external appearance, as compared with a configuration in which the support section 12 extends in a generally parallel direction to the touch operation surface of the touch pad 11. Similar effects can be obtained also with a configuration in which the support section 12 extends diagonally with respect to the touch operation surface of the touch pad 11 as shown in FIG. 8(c).

The method of decreasing the spring constant k of the support section 12 described above is an example, and the present disclosure is not limited thereto. The shape of the touch pad 11 and the support member 12 shown in FIG. 4 is an example, and the present disclosure is not limited thereto. For example, the spring constant k may be set so that the resonant frequency fk of the displacement vibration is less than 600 Hz, or set to be 200 to 300 Hz, for example. When one wishes to increase the spring constant k of the support section 12, the reverse of the methods (1) to (5) above may be employed. Alternatively, with the method (6) above, the shape of the support section 12 may be changed so that the spring constant k increases.

In practice, if the spring constant k is too small, the reliability of the touch pad 11 may possibly lower. In view of this, the mass may be increased, rather than decreasing the spring constant k, in order to lower the resonant frequency fk of the displacement vibration. For example, a weight may be attached to the touch pad 11. Where a display panel is arranged under the touch pad 11, the mass may be increased by attaching the display panel to the touch pad 11. Alternatively, the thickness h of the touch pad 11 may be increased. When the thickness h of the touch pad 11 is increased, the resonant frequency fb of the flexural vibration of the touch pad 11 is increased, making it easy to further reduce the difference in tactile sensation depending on the touch position.

Note that the method of increasing the resonant frequency fb of the flexural vibration described above is an example, and the present disclosure is not limited thereto. The shapes of the touch pad 11 shown in FIGS. 5A to 5M are examples, and the present disclosure is not limited thereto. For example, the touch pad 11 may be formed so that the resonant frequency fb of the flexural vibration of the touch pad 11 is greater than or equal to 600 Hz, or greater than or equal to 1 kHz, for example.

Figure 9:
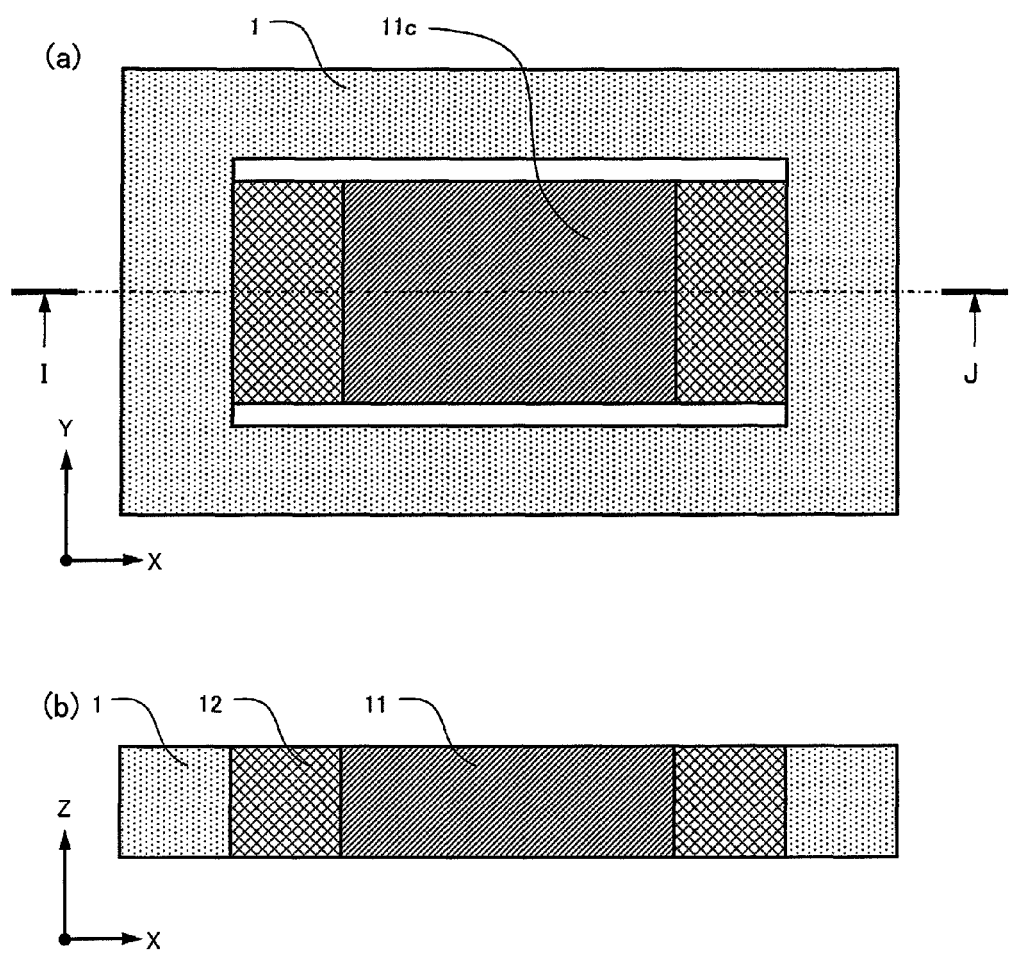
FIG. 9(a) and FIG. 9(b) are diagrams each showing an example of the touch pad according to the embodiment.

Note that where the touch pad 11 and the support section 12 are molded as an integral unit with no geometrically definite boundary therebetween as shown in FIGS. 9(a) and 9(b), the boundary between the touch pad 11 and the support member 12 may not be conspicuous on the external appearance. In such a case, a touch valid area 11c where touch operations are valid may be defined as the touch pad 11, and the other area as the support section 12.

Figure 10:
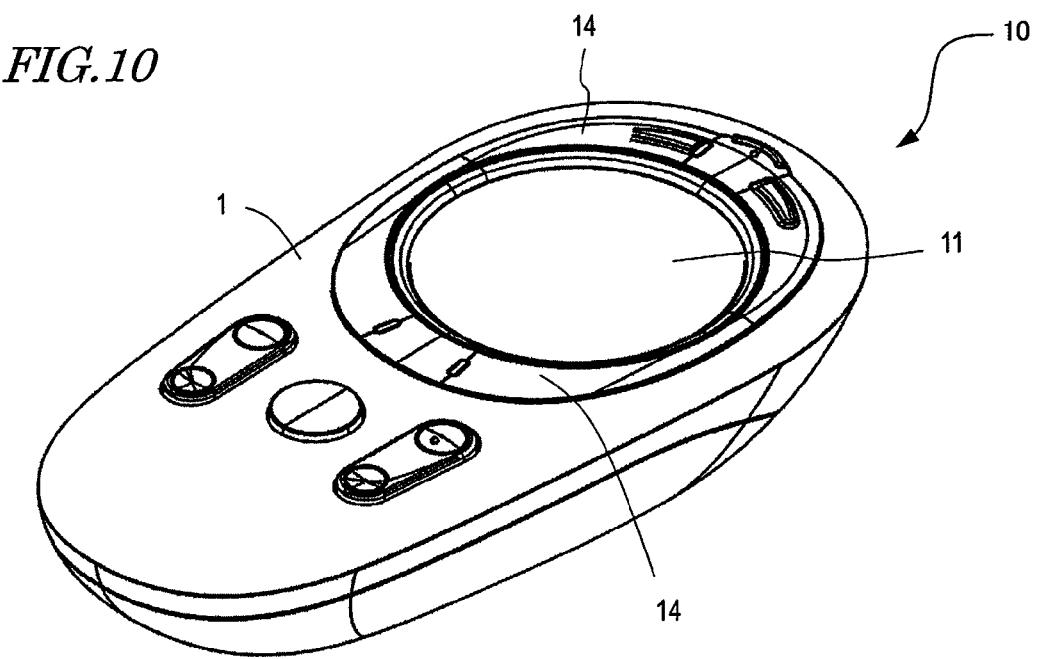
FIG. 10 is a perspective view showing the external appearance of an electronic apparatus according to the embodiment.

Note that while a notebook PC has been disclosed as an example of the electronic apparatus 10 in the present embodiment, the present disclosure is not limited thereto. For example, the electronic apparatus 10 may be a remote controller with a touch pad as shown in FIG. 10. The electronic apparatus 10 may also be an electronic apparatus for accepting touch operations of the user, such as a mobile telephone, a PDA, a game device, a car navigation, an ATM, or the like, for example. There is no limitation on the electronic apparatus 10 as long as it includes an input device for accepting touch operations of the user.

While tactile sensations are presented by causing vibration in the embodiment described above, the technique of the present disclosure is not limited thereto. For example, tactile sensations may be presented by combining vibration and another method, e.g., a variation of friction using static electricity, a skin stimulation using electric current, and a variation of the touch operation surface shape using liquid. In addition to presenting a tactile sensation, screen display, sound, light, heat, etc., may be used in combination as necessary.

Note that the control operation of the electronic apparatus 10 described above may be implemented by means of hardware or software. A computer program implementing such a control operation is stored, for example, in a memory on the control circuit 16 or in a ROM. Such a computer program may be installed onto the electronic apparatus 10 from a storage medium (an optical disc, a semiconductor memory, etc.) storing the computer program, or may be downloaded via a telecommunications network such as the Internet.

SUMMARY

For example, an apparatus according to the embodiment includes the touch pad 11 for accepting a touch operation of the user, the support section 12 for supporting the touch pad 11, and the vibrating section 13 attached to the touch pad 11 for flexurally deforming the touch pad 11. As the flexural vibration of the touch pad 11 is transmitted to the support section 12, the support section 12 deforms to vibrate in displacement vibration. The amplitude of the displacement vibration of the support section 12 is greater than the amplitude of the flexural vibration of the touch pad 11.

For example, an apparatus according to the embodiment further includes a control section for controlling the vibration of the vibrating section 13, wherein the control section performs a control so that the vibrating section 13 vibrates the touch pad 11 at a vibration frequency near the resonant frequency of the displacement vibration of the support section 12, and the resonant frequency of the flexural vibration of the touch pad 11 is higher than the resonant frequency of the displacement vibration of the support section 12.

For example, the touch pad 11 includes the touch operation section 11a to be touched by the user, and the touch sensor 11b for detecting a touch operation, wherein at least one of the touch operation section 11a and a base section 1 for supporting the support section 12 is molded as an integral unit with the support section 12.

For example, The resonant frequency of the displacement vibration of the support section 12 is less than 600 Hz.

For example, the resonant frequency of the flexural vibration of the touch pad 11 is greater than or equal to 600 Hz.

For example, the vibrating section 13 is a piezoelectric element.

For example, the vibrating section 13 is arranged on the opposite side of the touch operation surface of the touch pad 11 to be touched by the user.

For example, the support section 12 extends along the surface direction of the touch operation surface of the touch pad 11.

For example, an apparatus according to the embodiment further includes a decorative part, and at least a portion of the decorative part is arranged between the base section supporting the support section 12 and the touch pad 11.

For example, at least a portion of the decorative part is protruding toward the surface side relative to the touch operation surface of the touch pad 11.

For example, the touch sensor 11b is arranged between the touch operation section 11a and the vibrating section 13.

For example, the base section supporting the support section 12 and the support section 12 are connected to each other on the outer side of the outer periphery of the touch pad 11.

For example, an apparatus according to the embodiment includes two or more support sections 12.

For example, the support sections 12 are arranged generally uniformly along the perimeter of the touch pad 11.

For example, the support sections 12 extend generally radially from the center of the touch pad 11.

For example, the support sections 12 extend in a generally parallel direction from the opposing sides of the touch pad 11.

For example, the support section 12 surrounds the entire perimeter of the touch pad 11.

For example, the touch pad 11 has a generally disc shape.

For example, an apparatus according to the embodiment includes two or more support sections 12, wherein the touch pad 11 is supported by the support sections 12 at at least two locations, and the touch pad 11 is arranged between the two or more support sections 12.

Embodiments have been described above as an illustration of the technique of the present disclosure. The accompanying drawings and the detailed description are provided for this purpose. Thus, elements appearing in the accompanying drawings and the detailed description include not only those that are essential to solving the technical problems set forth herein, but also those that are not essential to solving the technical problems but are merely used to illustrate the technique disclosed herein. Therefore, those non-essential elements should not immediately be taken as being essential for the reason that they appear in the accompanying drawings and/or in the detailed description.

The embodiments above are for illustrating the technique disclosed herein, and various changes, replacements, additions, omissions, etc., can be made without departing from the scope defined by the claims and equivalents thereto.

The electronic apparatus of the present disclosure is suitably applicable to input devices of notebook PCs, remote controllers, portable information terminal devices, computer displays, car navigation systems, ATMs, ticket-vending machines, and the like.

What is claimed is:

1. An apparatus comprising:
   a touch pad for accepting a touch operation of a user;
   a support section for supporting the touch pad; and
   a vibrating section attached to the touch pad for flexurally deforming the touch pad, wherein:

as flexural vibration of the touch pad is transmitted to the support section, the support section deforms to vibrate in displacement vibration; and an amplitude of the displacement vibration of the support section is greater than an amplitude of the flexural vibration of the touch pad.

2. The apparatus of claim 1, further comprising a control section for controlling vibration of the vibrating section, wherein:

the control section perform a control so that the vibrating section vibrates the touch pad at a vibration frequency near a resonant frequency of the displacement vibration of the support section; and a resonant frequency of the flexural vibration of the touch pad is higher than the resonant frequency of the displacement vibration of the support section.

3. The apparatus of claim 1, the touch pad comprising:
a touch operation section to be touched by the user; and
a touch sensor for detecting the touch operation,
wherein at least one of the touch operation section and a base section supporting the support section is molded as an integral unit with the support section.

4. The apparatus of claim 1, wherein a resonant frequency of the displacement vibration of the support section is less than 600 Hz.

5. The apparatus of claim 1, wherein a resonant frequency of the flexural vibration of the touch pad is greater than or equal to 600 Hz.

6. The apparatus of claim 1, wherein the vibrating section is a piezoelectric element.

7. The apparatus of claim 1, wherein the vibrating section is arranged on an opposite side of a touch operation surface of the touch pad to be touched by the user.

8. The apparatus of claim 1, wherein the support section extends along a surface direction of a touch operation surface of the touch pad.

9. The apparatus of claim 1, further comprising a decorative part,
wherein at least a portion of the decorative part is arranged between a base section supporting the support section and the touch pad.

10. The apparatus of claim 9, wherein at least a portion of the decorative part is protruding toward a surface side relative to a touch operation surface of the touch pad.

11. The apparatus of claim 3, wherein the touch sensor is arranged between the touch operation section and the vibrating section.

12. The apparatus of claim 1, wherein a base section supporting the support section and the support section are connected to each other on an outer side of an outer periphery of the touch pad.

13. The apparatus of claim 1, comprising two or more support sections.

14. The apparatus of claim 1, wherein the support sections are arranged uniformly along a perimeter of the touch pad.

15. The apparatus of claim 1, wherein the support sections extend generally radially from a center of the touch pad.

16. The apparatus of claim 1, wherein the support sections extend in a parallel direction from opposing sides of the touch pad.

17. The apparatus of claim 1, wherein the support section surrounds an entire perimeter of the touch pad.

18. The apparatus of claim 1, wherein the touch pad has a disc shape.

19. The apparatus of claim 1, comprising two or more support sections, wherein:
the touch pad is supported by the support sections at at least two locations; and
the touch pad is arranged between the two or more support sections.

* * * * *